(12) United States Patent
Muschter et al.

(10) Patent No.: US 11,927,277 B2
(45) Date of Patent: Mar. 12, 2024

(54) VALVE UNIT

(71) Applicant: Festo SE & Co. KG, Esslingen (DE)

(72) Inventors: Jonas Muschter, Stuttgart (DE); Michael Ruthardt, Baltmannsweiler (DE)

(73) Assignee: Festo SE & Co. KG, Esslingen (DE)

( * ) Notice: Subject to any disclaimer, the term of this patent is extended or adjusted under 35 U.S.C. 154(b) by 122 days.

(21) Appl. No.: 17/538,295

(22) Filed: Nov. 30, 2021

(65) Prior Publication Data

US 2022/0178462 A1    Jun. 9, 2022

(30) Foreign Application Priority Data

Dec. 3, 2020  (DE) .......................... 102020215250.0

(51) Int. Cl.
*F16K 31/40* (2006.01)
*F16K 11/07* (2006.01)

(52) U.S. Cl.
CPC ............ *F16K 31/406* (2013.01); *F16K 11/07* (2013.01)

(58) Field of Classification Search
CPC .............................. F16K 11/07; F16K 31/406
USPC ......................................... 137/625.6, 625.64
See application file for complete search history.

(56) References Cited

U.S. PATENT DOCUMENTS

| | | | | |
|---|---|---|---|---|
| 5,588,465 | A | * | 12/1996 | Witowski ............ F15B 13/0814 137/884 |
| 2005/0061376 | A1 | * | 3/2005 | Miyazoe ............... F15B 13/043 137/625.64 |
| 2005/0236053 | A1 | * | 10/2005 | Miyazoe ............ F15B 13/0857 137/625.64 |

FOREIGN PATENT DOCUMENTS

EP    1184611 A2    3/2003
EP    1508732 A1    2/2005

* cited by examiner

*Primary Examiner* — Kelsey E Cary
(74) *Attorney, Agent, or Firm* — Hoffmann & Baron, LLP

(57) ABSTRACT

A valve unit has a main valve and a pilot valve device which is applied thereto, wherein the pilot valve device includes a first pilot valve which is arranged in a valve longitudinal direction between the main valve and a second pilot valve. The main valve can be actuated by way of a pilot fluid through a first pilot working channel which is connected to the first pilot valve and through a second pilot working channel which is connected to the second pilot valve. The second pilot working channel passes through a first pilot valve housing of the first pilot valve, wherein it has a receiving space channel section which passes through an actuation member receiving space of a hand actuation device which is formed in the first pilot valve housing and in which a manually actuatable hand actuation member is arranged. In this manner the valve unit can be realised with a low construction width.

21 Claims, 2 Drawing Sheets

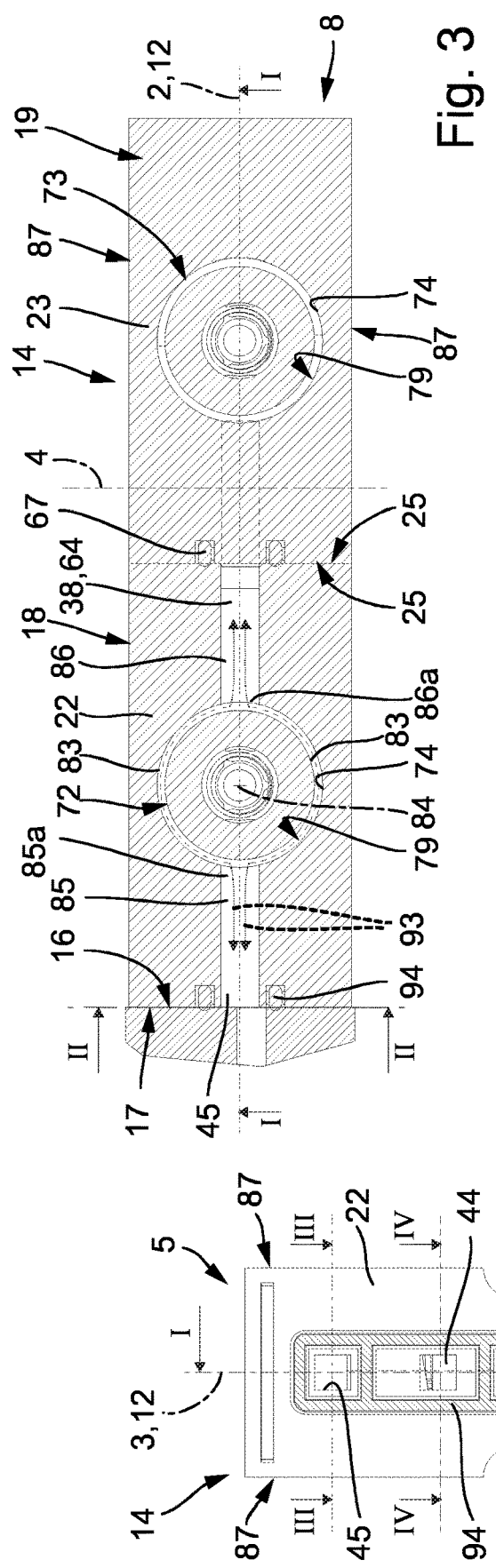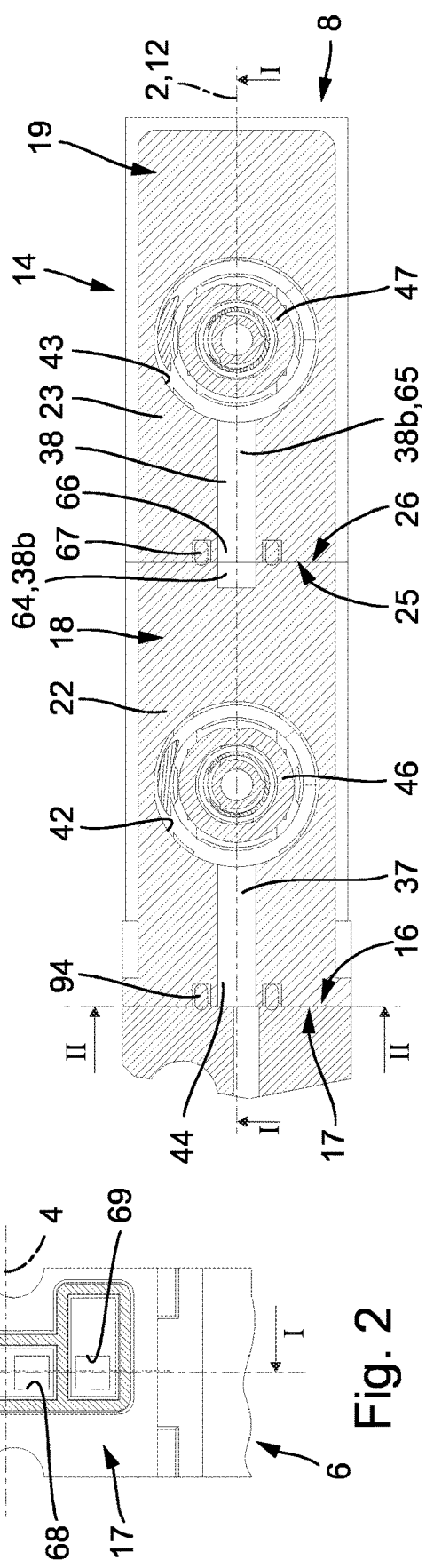

VALVE UNIT

BACKGROUND OF THE INVENTION

The invention relates to a valve unit, having an electro-fluidically pilot-operated main valve which comprises a main valve slide which by way of a fluid impingement which is opposite to one another can be moved to and fro whilst carrying out a switch-over movement, and having a pilot valve device which is arranged adjacently to the main valve in a valve longitudinal direction which is perpendicular to a valve height direction and by way of which the fluid impingement of the main valve slide can be controlled by way of a pilot fluid via a first pilot working channel and a second pilot working channel of the valve unit, wherein the pilot valve device comprises two electrically actuatable first and second pilot valves which are rowed on one another in the valve longitudinal direction and of which the first pilot valve is arranged between the main valve and the second pilot valve, wherein the first pilot valve comprises a first pilot valve housing, wherein a fluid flow of the pilot fluid in the first pilot working channel is controllable by way of the first pilot valve and a fluid flow of the pilot fluid in the second pilot working channel is controllable by way of the second pilot valve, wherein the second pilot working channel on its way between the second pilot valve and the main valve passes through the first pilot valve, and wherein the first pilot valve is provided with a hand-actuation device which comprises a hand actuation member which is received at least partly in an actuation member receiving space of the first pilot valve housing and which is accessible from outside the pilot valve device for manually creating an actuation movement which actuates the first pilot valve.

A valve unit of this type which is known from EP 1 508 732 A1 has a main valve with a main valve slide, wherein the main valve slide can be switched over between different switching positions by way of selective fluid impingement of its two end-faces which are opposite one another. For this fluid impingement, the valve unit comprises two pilot working channels which are each assigned to one of two pilot valves of a pilot valve device which is built axially onto the mains valve. A first of the two pilot valves is seated between the main valve and a second of the two pilot valves and can control the fluid flow of a pilot fluid in a first of the two pilot working channels. For this, the first pilot working channel extends away from the first pilot valve to the main stage. The second pilot valve can control the fluid flow of a pilot fluid in a second of the two pilot working channels which departs from the second control valve and on its way to the main valve passes through a pilot valve housing of the first pilot valve which is denoted as a first pilot valve housing. Both pilot valves are each provided with a hand actuation device, in order if necessary to be able to cause a manual actuation alternatively to an electrical actuation. Concerning the first pilot valve, the hand actuation device comprises a hand actuation member which can be manually adjusted in a valve height direction and which is accessible from outside the valve unit for impinging with a manual actuation force. The hand actuation member is seated in an actuation member receiving space of a pipe-stub-like continuation of a constituent of the first pilot valve housing, said constituent belonging to magnet valve cartridge, and in a housing constituent which envelops the magnet valve cartridge is passed through laterally by a second pilot working channel on its way to the main valve. The channel sections of the two pilot working channels which run in the pilot valve device run out at a front end-face of the first pilot valve housing in a manner lying next to one another transversely to the valve height direction, with which end-face the pilot valve device is built onto the main valve. On account of the outlined course of the channel of the two pilot working channels, a certain minimum dimension in the width of the pilot valve device which is measured in the valve height direction and a valve longitudinal direction which is at right angles thereto cannot be exceeded.

SUMMARY OF THE INVENTION

It is the object of the invention to provide measures which whilst ensuring the operational reliability permit a reduction of the construction width of the pilot valve device.

For achieving this object, concerning a valve unit in combination with the initially mentioned features, one envisages the second pilot working channel with a receiving space channel section passing through the actuation member receiving space in the region of the hand actuation member, said actuation member receiving space being formed in the first pilot valve housing.

In this manner, the second pilot working channel which is controllable with respect to the fluid flow of a pilot fluid by way of the second pilot valve is not led laterally past the actuation member receiving space in the inside of the first pilot valve housing, but extends directly through the actuation member receiving space which at least partly receives the hand actuation member. The channel section of the second pilot working channel which passes through the actuation receiving space is denoted as a receiving space channel section. According to the invention, thus a constituent of the first pilot valve which is necessary in any case for realising the hand actuation device, specifically the actuation member receiving space, is used for the leading of the channel of the second pilot working channel and one can make do without leading the second pilot working channel laterally past and next to the hand actuation device of the first pilot valve. This provides the advantageous possibility of a reduction of the construction width of the pilot valve device and thus of the complete valve unit in accordance with demands. The valve unit can be inexpensively manufactured in a very compact construction manner.

Advantageous further developments of the invention are to be derived from the dependent claims.

Concerning the two pilot valves, these for example can be piezovalves. However, a design as electrically actuatable magnet valves is particularly advantageous.

Expediently, the first pilot valve comprises a first pilot valve member which is movably arranged in a first valve chamber of the first pilot valve housing, wherein the hand actuation member given its actuation movement acts mechanically upon the first pilot valve member.

Preferably, the first pilot valve member can be switched over independently of an electromagnetic drive device by way of the actuation movement of the hand actuation member, by way of which a working movement of the first pilot valve member can be created, in order to set one of two possible operating states of the first pilot valve.

The main valve which can be controlled by way of the pilot valve device expediently comprises a main valve housing, in which the main valve slide is located and in which two drive chambers which are denoted as first and second drive chambers are formed, wherein the first drive chamber is delimited by a first drive surface of the main valve slide and the second drive chamber by a second drive surface of the main valve slide which is axially opposite with respect to the first drive surface. For the controlled fluid impingement with a pilot fluid, the first drive chamber is fluidically connected to the first pilot working channel and the second drive chamber to the second pilot working channel.

The two drive chambers are preferably assigned to end sections of the main valve housing which are opposite to one another in the valve longitudinal direction. Alternatively, it is also possible to assign both drive chambers to one and the same axial end section of the main valve housing and to herein provide the main valve slide for example with a drive piston which can be impinged in a dual-acting manner.

In order to fulfil the desired pilot valve function, the first pilot valve expediently comprises a first pilot valve member which is movably arranged in a valve chamber of the first pilot valve housing. The first pilot valve member is expediently alternatively positionable in one of two switching positions, in which it selectively vents or devents the first pilot working channel. The second pilot valve expediently has a corresponding construction. Expediently, a fluid-tight separation is realised between the receiving space channel section which passes through the actuation member receiving space of the first pilot valve and the valve chamber of the first pilot valve, in order to reliably rule out a mutual fluidic influencing. The fluid-tight separation is expediently realised with the help of a sealing device.

Preferably, the receiving space channel section is formed in the actuation member receiving space such that it extends at least somewhat peripherally around the hand actuation member. The receiving space channel section hence runs in an intermediate space between the outer periphery of the hand actuation member and the inner periphery of the actuation member receiving space. Such a design, at least with respect to the hand actuation member can be realised less expensively than a basically likewise possible construction form, concerning which the receiving space channel section passes through the hand actuation member.

An annular design of the receiving space channel section in a manner such that it peripherally extends completely around the hand actuation member in the actuation member receiving space is seen as being particularly expedient. In this context, the annularly designed receiving space channel section is expediently delimited radially inwards by the hand actuation member and radially outwards by a housing section of the first pilot valve housing which peripherally delimits the actuation member receiving space. The receiving space channel section can be realised for example as an annular gap which is formed coaxially around the hand actuation member. The annular shape of the receiving space channel section can be realised particularly simply by way of the hand actuation member in its assigned length section having a smaller outer diameter than the inner diameter of the actuation member receiving space. For realising the annular receiving space channel section, there is further for example the possibility of forming an annular groove in the outer periphery of the hand actuation member and/or in the inner periphery of the actuation member receiving space.

The second pilot working channel additionally to the receiving space channel section expediently yet has two further channel sections in the first pilot valve housing, and specifically a front channel section which leads to the main valve and a rear channel section which leads to the second pilot valve. These two front and rear channel sections expediently each run out with an inner channel opening into the actuation member receiving space at peripheral regions which are distanced to one another in the circumferential direction of the actuation member receiving space and in this manner merge into the receiving space channel section.

It is seen as being expedient if the inner channel opening of the front channel section and the inner channel opening of the rear channel section are arranged in peripheral regions of the actuation member receiving space which lie diametrically opposite in the valve longitudinal direction. The inner channel opening of the front channel section lies on the side of the main valve and the inner channel opening of the rear channel section lies on the side of the second pilot valve.

The hand actuation device is preferably designed such that the movement direction of the actuation direction of the hand actuation member, by way of which the operating state of the first pilot valve can be changed, runs in the valve height direction of the valve unit which is perpendicular to the valve longitudinal direction. The hand actuation member expediently in the region of a valve upper side of the valve unit which is orientated in the valve height direction has an actuation surface which can be impinged by hand or by way of a hand tool which is held in the hand, for example a screw driver, for creating the actuation movement.

For carrying out the actuation movement, the hand actuation member is expediently displaceable in the actuation member receiving space in a purely linear manner. The hand actuation is possible in a particularly simple manner in this way. Alternatively, for example a combined rotation-linear movement could also be considered.

The hand actuation member is preferably biased into a non-actuated home position by a restoring spring, the spring force of which having to be overcome for displacing into an actuated position. The hand actuation device can comprise locking means which permit the hand actuation member to be releasably locked in the actuated position.

Concerning a particularly inexpensive realisation, the hand actuation member is designed in a plunger-like manner and has a round and herein in particular a circularly round peripheral outer contour. The actuation member receiving space has a round inner contour which is complementary to this round outer contour.

The hand actuation member preferably comprises two sealing rings which are distanced to one another in the movement direction of its actuation movement and which bear on an inner peripheral surface of the actuation member receiving space in a slidingly displaceable manner amid sealing and which at both sides axially sealingly close the receiving space channel section of the second pilot working channel which extends through the actuation member receiving space. Expediently, one of the sealing rings seals the actuation member receiving space to the surroundings of the valve unit, whereas the other sealing ring seals off the actuation member receiving space to a valve chamber which is formed in the inside of the valve housing and in which a pilot valve member of the first pilot valve is located. Concerning an alternative embodiment, the sealing rings are fixed to the first valve housing in a stationary manner and the hand actuation member bears on the sealing rings in a slidingly displaceable manner.

The two pilot working channels expediently each have a length section which extends in the pilot valve device and which is denoted as the pilot valve channel section. Each pilot valve channel section expediently merges into a main valve channel section of the assigned first and second pilot working channel, said main valve channel section extending in the main valve. The two pilot valve channel sections expediently run out each with an exit opening at a front end-face of the first pilot valve housing which faces the main valve, wherein the exit opening of the pilot valve channel section of the first pilot working channel is denoted as a first pilot exit opening and the exit opening of the pilot valve channel section of the second pilot working channel is denoted as the second pilot exit opening. Each of these pilot exit openings expediently merges into one of the already mentioned main valve channel sections. If the pilot valve device is built onto the main valve, then the desired channel connections are accordingly created.

On account of the leading of the channel of the second pilot working channel through the actuation member receiving space, there is the advantageous possibility of arranging the two pilot exit openings on the front end-face of the first pilot valve housing in a manner distanced to one another in the valve height direction such that they lie in a common middle plane of the valve unit which is spanned by a valve longitudinal axis which defines the aforementioned valve longitudinal direction and a valve height axis of the valve unit which likewise defines the aforementioned valve height direction. The two pilot exit openings can therefore be placed on the front end-face of the first pilot valve housing in the middle with regard to width, which creates good conditions for a simple fluid connection to the main valve.

Expediently, a length section of a pilot feed channel which provides the pilot fluid and of a pilot deventing channel which is used for pilot deventing yet also extend in the pilot valve device. These channel sections also expediently run out at the front end-face of the first pilot valve housing, wherein they expediently likewise lie in the mentioned middle plane of the valve unit.

The pilot valve device can be designed as a construction unit, into which the two pilot valves are integrated, wherein both pilot valves have a common first pilot valve housing. However, a construction form concerning which the two pilot valves are formed separately from one another and the second pilot valve comprises a second pilot valve housing which is separate with respect to the first pilot valve housing of the first pilot valve is seen as being more advantageous, wherein the two pilot valve housings are applied onto one another in a joining region in the valve longitudinal direction with end-faces which face one another. Such a design of the two pilot valves which is separate from one another amongst other things simplifies the realisation of the necessary valve channels.

In the context of the realisation of the pilot valve device by way of in each case an individual first and second pilot valve housing of the two pilot valve units, it is expedient if the second pilot working channel comprises a first working channel section which contains the receiving space channel section and extends through the first pilot valve housing, and a second working channel section which extends in the second pilot valve housing, wherein the first and the second working channel section are in fluid connection with one another in the joining region of the two pilot valve housings. The first and the second working channel section in the joining region run out at the end-faces of the two pilot valve housings which face one another, in a manner such that they merge into one another—in particular amid the intermediate arrangement of a suitable sealing device.

Basically, only the first pilot valve can be provided with a hand actuation device, whereas the second pilot valve can be actuated in an exclusively electrical manner. However, it is more advantageous if the second pilot valve is also provided with a hand actuation device, so that each pilot valve has an individual hand actuation device for an individual manual actuation in accordance with requirements, additionally to the possibility of an electrical actuation which is created by an electronic control device.

The hand actuation device of the second pilot valve preferably comprises a hand actuation member which is received at least partly in an actuation member receiving space and which is accessible from outside the pilot valve device for manually creating an actuation movement which actuates the second pilot valve. The two hand actuation devices in particular are arranged such that they are accessibly from the same side of the valve unit, in particular from a valve upper side of the valve unit which is orientated in the valve height direction.

Preferably, the first pilot valve comprises a first pilot valve member which is movably arranged in its first pilot valve housing, whereas the second pilot valve comprises a movable second pilot valve member. Both pilot valve members are designed in an electrically actuatable manner for changing the operating state of the assigned pilot valve. Furthermore, the pilot valve member of each pilot valve which is provided with a hand actuation device is alternatively also manually actuatable.

BRIEF DESCRIPTION OF THE DRAWINGS

The invention is hereinafter explained in more detail by way of the accompanying drawing. In these are shown in.

DETAILED DESCRIPTION

Figure 1:
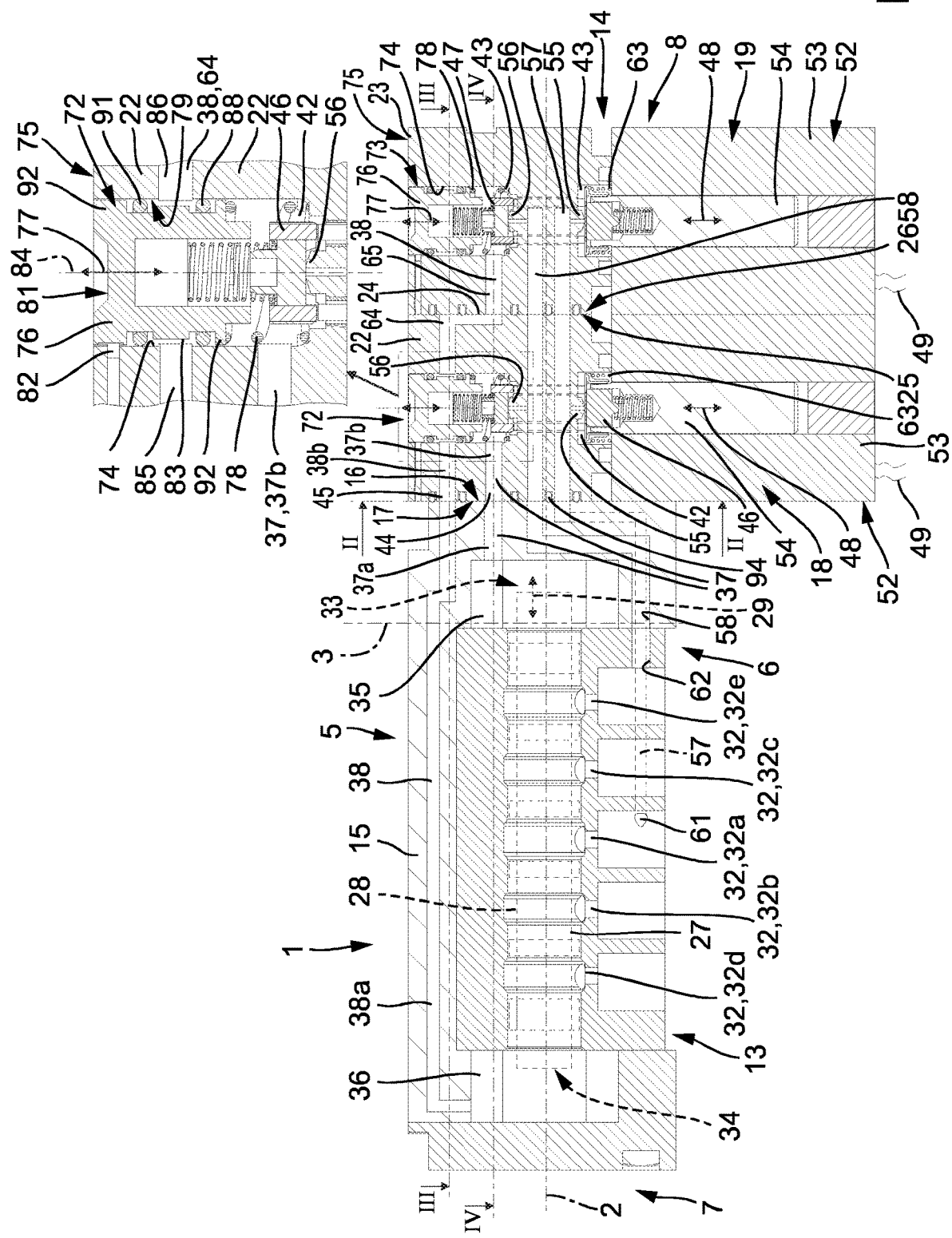
FIG. 1 a longitudinal section of a preferred embodiment of the valve unit according to the invention, according to the section plane I-I of FIGS. 2, 3 and 4, wherein a main valve slide of the main valve is merely indicated in a dot-dashed manner, FIG. 2 a section through the valve unit of FIG. 1 according to section plane II-II of FIGS. 1, 3 and 4 in the transition region between the pilot valve device and the main valve, FIG. 3 a longitudinal section according to section plane III-III of FIGS. 1 and 2 with an only partial illustration of the main valve and FIG. 4 a further longitudinal section according to section line IV-IV of FIGS. 1 and 2, wherein again the main valve is only partially visible.

The valve unit which is denoted in its entirety with the reference numeral 1 has a valve longitudinal axis 2, a valve height axis 3 which is perpendicular thereto and a valve transverse axis 4 which is at right angles to the two aforementioned axes 2, 3. Directions which extend in the respective axis direction are denoted with the same reference numerals as the valve longitudinal direction 2, as the valve height direction 3 and as the valve longitudinal direction 2.

Irrespective of these axis definitions, the valve unit 1 can be operated in an arbitrary spatial orientation, for example with a vertically or horizontally aligned valve height axis 3.

The valve unit 1 has a valve upper side 5 which is orientated in the valve height direction 3 and which in FIG. 1 lies at the top. Opposite to this, the valve unit 1 has a valve lower side 6. Furthermore, the valve unit 1 has a valve front side 7 which is orientated in the valve longitudinal direction and lies at the left in FIG. 1 and a valve rear side 8 which is axially opposite to this.

The dimensions of the valve unit 1 in the valve transverse direction 4 define a width of the valve unit 1. At the width centre, an imaginary middle plane 12 which is spanned by the valve longitudinal axis 2 and the valve height axis 3 extends through the valve unit 1.

The valve unit 1 has a main valve 13 and a pilot valve device 14. The latter serves for the electrofluidic and in particular electromagnetic piloting of the main valve 13.

The main valve 13 has a main valve housing 15 with a rear end-face 16 which faces the valve rear side 8, wherein the pilot valve device 14 is applied with a front edge-face 17 which faces the valve front side 7 onto the rear end-face 16 of the main valve housing 15 and fastened thereto. As is evident, the pilot valve device 14 is therefore arranged on the main valve 13 in an adjacent manner in the valve longitudinal direction 2.

The pilot valve device 14 has two pilot valves 18, 19 which are rowed to one another in the valve longitudinal direction 2, are each electrically actuatable and for an improved differentiation are denoted as a first pilot valve 18 and a second pilot valve 19. The first pilot valve 18 is arranged between the main valve 13 and the second pilot valve 19 with respect to the valve longitudinal direction 2 and has a valve housing which is denoted as a first pilot valve housing 22 and on which the end-face 17 of the pilot valve device 14 which is mentioned further above is formed.

The two pilot valves 18, 19 according to the illustrated embodiment example are preferably designed separately from one another and in a joining region 14 are applied onto one another in the valve longitudinal direction 2. For this, the second pilot valve 19 has an individual valve housing which is denoted as a second pilot valve housing 23 and which has a front end-face 23 which faces the first pilot valve 18 and with which it is applied in the joining region 24 onto a rear end-face 26 of the first pilot valve housing 22 which faces the valve rear side 8.

The two pilot valves 18, 19 are fixedly connected amongst one another and to the main valve 13, in particular in a releasable manner, by way of fastening means which are not illustrated further, such as for example fastening clips and/or fastening screws.

Concerning an embodiment example which is not illustrated, the two pilot valves 18, 19 which are rowed on one another are integral constituents of the pilot valve device 14 which in this case is designed as a pilot valve unit. In this case, only one pilot valve housing is present, wherein in particular the first pilot valve housing 22 simultaneously functions as a valve housing for the second pilot valve 19.

The main valve 13 is a multi-way valve with basically an arbitrary functionality. In particular, it is the case of a two-position valve or a three-position valve. For example, the main valve 13 is conceived as a 5/2 multi-way valve.

A cavity which extends in the valve longitudinal direction 2 and functions as a slide receiver 27 is formed in the inside of the main valve housing 15. An elongate main valve slide 28 which is only shown dashed in the drawing and which can be switched over between at least two switching positions whilst carrying out a linear switch-over movement 29 in the valve longitudinal direction 2, said movement being indicated by a double arrow, extends in the slide receiver 27. Several main valve channels 32 which pass through the main valve housing 15 run out laterally at a mutual distance into the slide receiver 27 and in different channel configurations are connected to one another and/or separated from one another depending on the momentary switching position of the main valve slide 28.

By way of example, the five main valve channels 32 define a main feed channel 32*a*, two main working channels 32*b*, 32*c* and two main deventing channels 32*d*, 32*e*. In the two exemplary possible switching positions of the main valve slide 28, the main feed channel 32*a* is either connected to the one or the other working feed channel 32*b*, 32*c*, whilst the respective other main working channel 32*c*, 32*d* is simultaneously connected to one of the two main deventing channels 32*d*, 32*e*.

On operation of the valve unit 1, the main feed channel 32*a* is connected onto a pressure source which provides a fluidic pressure medium, in particular pressurised air, which is to be distributed by the main valve 13. The two main working channels 32*b*, 32*c* are connected to a consumer which is to be fluidically controlled, for example to a fluid-actuated drive. The two main deventing channels 32*d*, 32*e* are connected to a pressure sink, in particular to the atmosphere.

The main valve slide 28 has a first drive surface 33 which faces the valve rear side 8 and a second drive surface 34 which is orientated axially oppositely with respect to this. By way of example, these two drive surfaces 33, 34 are each located at one of the two axial end regions of the main valve slide 28. Whereas the first drive surface 33 together with the main valve housing 15 delimits a first drive chamber 35, the second drive surface 34 together with the main valve housing 15 delimits a second drive chamber 36. The first drive chamber 35 is located in the rear end region of the main valve housing 15 which is adjacent to the pilot valve device 14, whereas the second drive chamber 36 is formed in the front end region of the main valve housing 15 which is axially opposite with respect to this.

A first pilot working channel 32 and a second pilot working channel 38 pass through the valve unit 1. The first pilot working channel 37 creates a fluid connection between the first pilot valve 18 and the first drive chamber 35, whereas the second pilot working channel 38 creates a fluid connection between the second pilot valve 19 and the second drive chamber 36.

Each pilot working channel 37, 38 has a main valve channel section 37*a*, 38*a* which extends in the main valve housing 15 and which at one end runs out into one of the two drive chambers 35, 36 and at the other end runs out to the rear end-face 16.

A pilot valve channel section 37*b* of the first pilot working channel 37 which runs in the first pilot valve housing 22 connects onto the main valve channel section 37*a* of the first pilot working channel 37 and one the one hand runs out into a first valve chamber 42 which is formed in the first pilot valve housing 22 and on the other hand comprises a first pilot exit opening 44 which runs out towards the front end-face 17 and which is flush with and thus fluid-connected to, the opposite channel opening of the main valve channel section 37*a* of the first pilot working channel 37, said channel opening being arranged on the rear end-face 16.

A pilot valve channel section 38*b* of the second pilot working channel 38 which runs in the pilot valve device 14 connects onto the main valve channel section 38*a* of the second pilot working channel 38, said pilot valve channel section at one end running out into a valve chamber of the second pilot valve 19 which is denoted as a second valve chamber 43 and at the other side running out with a second pilot exit opening 45 at the front end-face 17, said second pilot exit opening being placed such that it is flush with and thus fluid-connected to, the channel opening of the main valve channel section 38 of the second pilot working channel 38, said channel opening being arranged lying opposite on the rear end-face 16.

In this manner, a constant fluid connection between the first valve chamber 42 and the first drive chamber 35 as well as between the second valve chamber 43 and the second drive chamber 36 is present.

Accordingly, the first pilot valve 18 is capable of subjecting the main valve slide 28 to a pilot fluid in a first direction in a controlled manner through the first pilot working channel 37, whereas the second pilot valve 19 is capable of subjecting the main valve slide 28 to a pilot fluid in an opposite second direction through the second pilot working channel 28 likewise in a controlled manner. The controlled fluid impingement is selectively manifested either in a feed of a pilot fluid which can also be denoted as a venting, or in a discharge of the pilot fluid which can be denoted as a deventing. Depending on the set operating state of the pilot valves 18, 19, the main valve slide 28 expediently undergoes an actuation force in the first direction or in the opposite second direction, so that it is either moved into the first switching position or into a second switching position, by way of which the respective one of two channel configurations of the main valve channels 32 is set.

In particular, the pilot fluid is pressurised air. Alternatively, the pilot fluid as also the fluid which is to be controlled by way of the main valve 13 can be a pressurised liquid.

A first pilot valve member 46 is located in the first valve chamber 42 which belongs to the first pilot valve 18. A second pilot valve member 47 is situated in the second valve chamber 43 which belongs to the second pilot valve 19. Each pilot valve member 46, 47 is designed of one part or of several parts and can execute a linear working movement 48 in directions which are opposite to one another, said working movement being indicated by a double arrow, wherein the movement directions by way of example run in the valve height direction 3.

Each pilot valve 18, 19 expediently comprises an electromagnetic drive device 52, by way of which the working movement 48 of the assigned first and second pilot valve member respectively can be created, in order to set one of two possible operating states of the respective pilot valve 18, 19. Concerning the two operating states, it is on the one hand a venting operating state and on the other hand a deventing operating state.

Each electromagnetic drive device 52 is connectable or connected to an electronic control device which is now shown further, via electrical leads 49 which are realised for example by way of cables or circuit boards, said control device being capable of providing electrical control signals for the electrical actuation of the drive device 52. An automated operation of the valve unit 1 is possible in this manner.

Each electromagnetic drive device 52 expediently has a coil device 53 which can be subjected to current, and a movable magnet armature 54. The magnet armature 54 can be moved by way of the alternating activation and deactivation of the coil device 53, in order to create the working movement 48 of the pilot valve member 46, 47 which is assigned to it. In this context, the magnet armature 54 with regard to drive cooperates with the assigned first or second pilot valve member 46, 47 or is a direct constituent of this first or second pilot valve member 46, 47.

Each pilot valve member 46, 47 can sealingly interact in an alternating manner either with a venting valve seat 55 or with a deventing valve seat 56, depending on the position. The venting valve seat 55 frames a feed opening, via which the one pilot feed channel 57 runs out into the assigned valve chamber 42, 43. The deventing valve seat 56 frames a discharge flow opening, via which a pilot deventing channel 58 runs out into the respectively assigned valve chamber 42, 43. Preferably, a common pilot feed channel 57 is assigned to the two venting valve seats, as also expediently a common pilot deventing channel 58 is assigned to the two deventing valve seats 56.

The pilot feed channel 57 extends partly in the two pilot valve housings 22, 23 and partly in the main valve housing 15, wherein by way of example it runs out in the main valve housing 15 into the mains feed channel 32a via a tapping opening 61, so that the pilot fluid for the pilot valve device 14 is tapped from the main feed channel 32a. However, it is to be understood that alternatively a feed of the pilot fluid into the pilot feed channel 57 can be effected independently of the main feed channel 32a.

The pilot deventing channel 58 likewise extends partly into the two pilot valve housings 22, 23 and furthermore partly into the man valve housing 15, where by way of example it runs out via a deventing opening 62 into one of the main deventing channels 32e. Alternatively, the pilot deventing channel 58 can also be connected to the atmosphere independently of the main deventing channels 32d, 32e of the main valve 13.

In the venting operating state of a pilot valve 18, 19, its pilot valve member 46, 47 sealingly bears on the deventing valve seat 56 and simultaneously releases the venting valve seat 55, so that pilot fluid can flow out of the pilot feed channel 57 through the assigned valve chamber 42, 43 into the first or second pilot working channel 37, 38 which is connected thereto. In the deventing operating state, the pilot valve member 46, 47 sealingly bears on the assigned venting valve seat 55 and is simultaneously lifted from the deventing valve seat 56, so that the assigned pilot working channel 37, 38 can be devented through the valve chamber 42, 43 and the assigned pilot deventing channel 58.

Expediently, each pilot valve member 46, 47 is biased into a home position by way of a spring device 63 which is assigned to it, which by way of example sets the deventing operating state. By way of electrically activating the assigned electromagnetic drive devices 52, the pilot valve member 46, 47 can be moved out of the home position, in order to change the operating state.

The pilot valve channel section 37b of the first pilot working channel 37 extends in the pilot valve device 14 exclusively in the first pilot valve housing 22. There, by way of example it has a straight-lined course in the valve longitudinal direction 2 between the first valve chamber 42 and the front end-face 17.

The pilot valve channel section 38b of the second pilot working channel 38 is divided into two length sections which merge into one another in the joining region 24, and specifically into a first working channel section 64 which passes through the first pilot valve housing 22 between the front end-face 17 and the rear end-face 26, and a second working channel section working channel section 65 which at one end runs out into the second valve chamber 43 and at the other end runs out via a front channel opening 66 to the front end-face 25 of the second pilot valve housing 22 such that it is flush with and fluidically connected to, the end of the first working channel section 64 which runs out at the rear end-face 26 of the first pilot valve housing 22. Hence the venting and deventing of the second drive chamber 36 is effected through the first pilot valve housing 22, and specifically through the first working channel section 64 of the second pilot working channel 38 which passes through the first pilot valve housing 22.

A seal 67 which is placed in the joining region 24 seals the fluid connection between the two working channel sections 64, 65, to the outside.

The aforementioned seal 67 expediently also serves for sealing with respect to the pilot feed channel 57 and the pilot deventing channel 58. These two channels 57, 58 each extend in both pilot valve housings 22, 23, wherein they merge into one another in the joining region 24, wherein their transition regions into the joining region 24 are sealed to the surroundings by way of the seal 67.

The length sections of the pilot feed channel 57 and of the pilot deventing channel 58 which extend in the pilot valve device 14 run out at the front end-face 17 of the pilot valve device 14, and specifically with a feed channel exit opening 68 and with a deventing channel exit opening 69. Channel openings of longitudinal sections of the pilot feed channel 57 and of the pilot venting channel 58 lie opposite these exit openings 68, 69, said channel runs-outs being formed on the rear end-face 16 of the main valve housing 15 and said longitudinal sections extending in the main valve housing 15, so that a continuous fluid connection is given within the pilot feed channel 57 and the pilot deventing channel 58.

The first pilot valve 18 is provided with a hand actuation device 72 which alternatively to the use of the electromagnetic drive device 52 permits a manual change of the operating state of the first pilot valve 18. Hence if necessary, a hand operation i.e. a manual operation without participation of the preferably connected electronic control device is possible.

Preferably, the second pilot valve 19 is also provided with a corresponding hand actuation device 73, wherein hereinafter for a better differentiation in the case of the first pilot valve 18 one speaks of a first hand actuation device 72 and in the case of the second pilot valve 19, of a second hand actuation device 73. Since the two hand actuation devices 72, 73 are preferably designed in an identical manner, hereinafter a unitary description is effected, wherein the same reference numerals are used for constituents which correspond to one another.

Since the hand actuation devices 72, 73 permit an alternative manual actuation as a replacement with regard to the electrical actuation, they can also be denoted as hand aid actuation devices 72, 73.

Each hand actuation device 72 has an actuation member receiving space 74 which is formed in the assigned pilot valve housing 22, 23 and which by way of example is realised by way of a housing recess which departing from an upper housing outer surface 75 which lies on the valve upper side 5 extends in the valve height direction 3 into the pilot valve housing 22, 23. The actuation member receiving space 74 by way of example merges directly into the connecting first or second valve chamber 42, 43.

As one can derive in particular from FIG. 3, the actuation member receiving space 74 preferably has a round and in particular a circularly round inner contour with an inner peripheral surface 79 which is formed on a housing section of the assigned first or second pilot valve housing 22, 23 which peripherally delimits the actuation member receiving space 74.

A hand actuation member 76 is seated in each actuation member receiving space 74 which is open to the upper housing outer surface 75, and has an outer contour which is adapted to the peripheral inner contour of the actuation member receiving space 74 in a manner such that it is linearly displaceable relative to the assigned pilot valve housing 22, 23 in the valve height direction 3. The movement which is herein executable by the hand actuation member 76 is indicated by a double arrow and it denoted as an actuation movement 77.

With regard to each pilot valve 18, 19, the hand actuation member 76 and the pilot valve member 46, 47 in particular are arranged such that the actuation movement 77 and the working movement 48 have the same alignment or are aligned parallel to one another.

Each hand actuation member 76 is biased into a non-actuated home position by way of a restoring spring 78 which is arranged in the actuation member receiving space 74 and/or in the assigned first or second valve chamber 42, 43. In this non-actuated home position, an axial distance is present between the hand actuation member 76 and the assigned pilot valve member 46, 47, so that the latter can be electrically actuatable without hindrance.

Each hand actuation member 76 has an actuation surface 81 which faces away from the assigned pilot valve housing 22, 23 and is accessible from outside the pilot valve device 14. The actuation surface 81 in this valve height direction 3 is away from the pilot valve member 46, 47 which is adjacent in the valve height direction 3.

By way of a manual impingement of the actuation surface 81, the hand actuation member 76 can be initiated into an actuation movement 77 in the direction of the axially flush first and second pilot valve member 46, 47 whilst overcoming the restoring force of the restoring spring 78. This actuation movement 77 leads to the hand actuation member 76 acting mechanically upon the assigned pilot valve member 46, 47 and this being switched over independently of the electromagnetic drive device 51.

By way of example, the pilot valve member 46, 47 by way of the impingement on the part of the hand actuation member 76 can be moved out of a home position which is set by the spring device 63, in order to cause a change of the operating state of the respective pilot valve 18, 29.

A securing element 82 which is anchored in the pilot valve 22, 23 prevents the hand actuation member 76 from falling out of the actuation member receiving space 74.

By way of example, the hand actuation member 76 is arranged completely in the inside of the actuation member receiving space 74 independently of its position. Concerning an embodiment example which is not illustrated, it projects somewhat out of the assigned pilot valve housing 22, 23 at least in the non-actuated home position.

By way of example, the hand actuation member 76 is displaceable in a purely linear manner for carrying out the actuation movement 77 in the actuation member receiving space 74. Alternatively, the hand actuation device 72, 73 however by way of example can also be designed such that the linear actuation movement 77 results from a screwing movement of the hand actuation member 76 which can be created by way of rotating the hand actuation member 76, so that in total a superimposed rotation linear movement is present.

Concerning an embodiment example of the valve unit 1 which is likewise not shown in the embodiment example, at least one hand actuation member 76 is designed for carrying out a purely rotational actuation movement 77, wherein it expediently comprises an actuation cam which interacts with the assigned pilot valve member 46, 47.

It is advantageous if the hand actuation member 67 is designed in a plunger-like manner in accordance with the illustrated embodiment example and comprises a round, peripheral outer contour.

The hand actuation member 76 can be manufactured of a solid material, but by way of example comprises a hollow space which is open to the adjacent valve chamber 42, 43, so that it is structured in a beaker-like manner.

A particularity of the first hand actuation device 72 lies in the fact that its actuation member receiving space 74 contributes to the formation of the second pilot working channel 38. The second pilot working channel 38 with its first working channel section 64 in the region of the hand actuation member 76 passes through the actuation member receiving space 74 which is formed in the first pilot valve housing 22, so that the actuation member receiving space forms a length section of the second pilot working channel 38 which is denoted as a receiving space channel section 83.

The receiving space channel section 83 is preferably designed in an annular manner, so that according to the illustrated embodiment example it extends peripherally completely around the hand actuation member 76. By way of example, the hand actuation member 78 has a longitudinal axis 84 which extends in the valve height direction 3 and whose axial direction coincides with the movement direction of the actuation movement 77. The receiving space channel section 83 runs around the hand actuation member 76 in the circumferential direction of the longitudinal axis 84. The thus annular receiving space channel section 83 is expediently delimited radially inwards in a direct manner by the hand actuation member 76, whereas its is delimited radially outwards by the inner peripheral surface 79 of the actuation member receiving space 74 which faces radially inwards.

Preferably, a radial annular gap which forms the receiving space channel section 82 extends coaxially around the hand actuation member 76 in the actuation member receiving space 74.

Concerning an embodiment example which is not shown, the receiving space channel section 83 does not extend completely, but only a little peripherally around the hand actuation member 76, for example along a circumferential angle of 180 degrees.

Concerning an embodiment example which is likewise not shown, a receiving space channel section 83 passes through the hand actuation member 76 within the actuation member receiving space 74, in particular diametrically.

By way of example, the receiving space channels section 83 is located between a front channel section 85 and a rear channel section 86 of the first working channel section 64 which passes through the first pilot valve housing 22. The front channel section 85 extends between the second pilot exit opening 45 and a first inner channel opening 85a, via which it runs out into the actuation member receiving space 74 at the inner peripheral surface 79. The rear channel section 86 extends between the rear end-face 26 of the first pilot valve housing 22 and a second inner channel opening 86a, wherein it runs out with the latter into the actuation member receiving space 74 likewise at the inner peripheral surface 79.

The two inner channel openings 85a, 86a are located on peripheral regions of the actuation member receiving space 74 which are distanced to one another in the circumferential direction of the actuation member receiving space 74. The illustrated arrangement is preferred, according to which the two inner channel openings 85a, 86a are assigned to peripheral regions of the actuation member receiving space 74 which are diametrically opposite in the valve longitudinal direction 2. Preferably, the two inner channel runs-outs 85a, 86a lie in the middle plane 82 which is described further above, wherein it is advantageous if the complete front and rear channel section 85, 86 of the second pilot working channel 38 extends in this middle plane 12.

Since the second pilot working channel 38 passes through the actuation member receiving space 74 in the inside of the first pilot valve housing 22, a lateral bypassing in the region of the two longitudinal sides of the first pilot valve housing 22 which are oriented in the valve transverse direction is not necessary. Hence the first pilot valve housing 22 can be designed in a very narrow manner in the valve transverse direction and accordingly with a very low width. The section of the first pilot valve housing 22 which lies between the actuation member receiving space 74 and the two side surfaces 87 of the first pilot valve housing 22 which is orientated in the valve transverse direction 4 is preferably designed without channels.

In order to prevent an interaction between the pilot fluid which flows in the second pilot working channel 38 and the pilot fluid which is located in the first valve chamber 42, the receiving space channel section 38 is separated from the adjacent first valve chamber 42 in a fluid-tight manner, expediently in a continuous manner. This is expediently effected by way of the hand actuation member 76 being provided with a sealing ring 88 in a region which lies between the receiving space channel section 83 and the first valve chamber 42, said sealing ring being denoted as an inner sealing ring 88 for the purpose of a better differentiation. This inner sealing ring 88 is preferably held in an annular groove on the outer periphery of the hand actuation member 76 and bears on the inner peripheral surface 79 of the actuation member receiving space 74 in a slidingly displaceable manner.

It is advantageous of the receiving space channel section 83 is also sealed to the surroundings. By way of this, a fluid exit can also be reliably prevented in the region of the upper housing outer surface 75. Expediently, a sealing ring 91 is likewise provided for the sealing and for a better differentiation is denoted as an outer sealing ring 91 and is fixed on the radial outer periphery of the hand actuation member 76 at an axial distance to the inner sealing ring 88, expediently likewise in an annular groove which is formed there.

Expediently, a guide section 92 of the hand actuation member 76 connects onto each of the two sealing rings 88, 91 at the axial side which is away from the respective other sealing ring 91, 88, said guide section bearing on the inner peripheral surface 79 in a slidingly displaceable manner with as little play as possible, so that a linear guidance of the hand actuation member 76 which prevents jamming is given for carrying out the actuation movement 77. The guide section 92 is preferably contoured in a cylindrical manner.

In the length section which lies axially between the two sealing rings 88, 91, the hand actuation member 71 is expediently provided with a reduced outer diameter for forming an annular gap, through which pilot fluid can flow, wherein the annular gap forms the receiving space channel section 83.

On account of the annular shape of the receiving space channel section 83, pilot fluid can flow around the hand actuation member 76 with a parallel flow on peripheral sides which are diametrically opposite one another, as is indicated in FIG. 3 by way of dotted flow arrows 93. The fluid flow can hereby split into two flow branches within the actuation member receiving space 74, so that already a relatively small cross section of the receiving space channel section 83 is sufficient, in order to ensure the necessary throughflow.

FIG. 2 illustrates the advantageous possibility realised with the illustrated embodiment example, of arranging the two pilot exit openings 44, 45 in the middle plane 12 which is defined further above, in a manner distanced to one another in the valve height direction 3. The feed channel exit opening 68 and the deventing channel exit opening 69 are expediently placed in this middle plane 12, so that an opening row of four exit openings 44, 45, 68, 69 which are rowed to one another at a distance in the valve height direction 3 results.

The rowed arrangement of the exit openings 44, 45, 68, 69 which is concentrated onto the middle plane 12 likewise encourages a design of the valve unit 1 which is narrow in the valve transverse direction 4.

Expediently, a seal 94 which is well evident from FIG. 2 is integrated between the rear end-face 16 of the main valve housing 15 and the front end-face 17 of the pilot valve device 14, said seal individually surrounding the individual exit openings 44, 45, 68, 68 and thus permitting the desired channel connections without a danger of leakage.

What is claimed is:

1. A valve unit, having an electrofluidically pilot-operated main valve, said main valve comprising a main valve slide, said main valve slide being movable in a valve longitudinal direction and opposite to the valve longitudinal direction by a fluid impingement whilst carrying out a switch-over movement, said fluid impingement acting on opposite sides of the main valve slide, and wherein the valve unit further comprises a pilot valve device, said pilot valve device being arranged adjacently to the main valve in the valve longitudinal direction, said valve longitudinal direction being perpendicular to a valve height direction, wherein the fluid impingement of the main valve slide is controlled by the pilot valve device with a pilot fluid via a first pilot working channel and a second pilot working channel of the valve unit, wherein the pilot valve device comprises an electrically actuatable first pilot valve and an electrically actuatable second pilot valve wherein the first and second pilot valves are arranged in a row in the valve longitudinal direction and wherein the first pilot valve is arranged between the main valve and the second pilot valve, wherein the first pilot valve comprises a first pilot valve housing, wherein a fluid flow of the pilot fluid in the first pilot working channel is controllable by way of the first pilot valve and a fluid flow of the pilot fluid in the second pilot working channel is controllable by way of the second pilot valve, wherein the second pilot working channel connects the second pilot valve and the main valve, wherein the second pilot working channel passes through the first pilot valve, and wherein the first pilot valve is provided with a hand-actuation device, said hand-actuation device comprising a hand actuation member, said hand actuation member being received at least partly in an actuation member receiving space of the first pilot valve housing and further being accessible from outside the pilot valve device for manually creating an actuation movement, wherein the actuation movement actuates the first pilot valve, wherein the second pilot working channel with a receiving space channel section passes through the actuation member receiving space, the actuation member receiving space being formed in the first pilot valve housing, in the region of the hand actuation member.

2. The valve unit according to claim 1, wherein the first and second pilot valves are electrically actuatable magnet valves.

3. The valve unit according to claim 1, wherein the first pilot valve comprises a first pilot valve member, the first pilot valve member being movably arranged in a first valve chamber of the first pilot valve housing, wherein the hand actuation member acts mechanically upon the first pilot valve member.

4. The valve unit according to claim 3, wherein the first pilot valve member is switchable by the actuation movement of the hand actuation member independently of an electromagnetic drive device of the first pilot valve, wherein a working movement of the first pilot valve member can be created by the electromagnetic drive device in order to set one of two possible operating states of the first pilot valve.

5. The valve unit according to claim 1, wherein the main valve comprises a main valve housing, the main valve housing receiving the main valve slide and wherein two first and second drive chambers are formed in the main valve housing, said two first and second drive chambers being delimited by first and second drive surfaces of the main valve slide, said first and second drive surfaces being oriented oppositely to one another in the valve longitudinal direction, wherein the first pilot working channel is fluidically connected to the first drive chamber and the second pilot working channel is fluidically connected to the second drive chamber.

6. The valve unit according to claim 1, wherein the first pilot valve comprises a first pilot valve member, said first pilot valve member being movably arranged in a first valve chamber of the first pilot valve housing, wherein the receiving space channel section is separated from the first valve chamber.

7. The valve unit according to claim 1, wherein the receiving space channel section of the second pilot working channel in the actuation member receiving space extends at least partly peripherally around the hand actuation member.

8. The valve unit according to claim 7, wherein the receiving space channel section of the second pilot working channel has an annular shape and, in the actuation receiving space, extends peripherally completely around the hand actuation member.

9. The valve unit according to claim 8, wherein the receiving space channel section is delimited radially inwards by the hand actuation member and radially outwards by a housing section of the first pilot valve housing wherein the first pilot valve housing peripherally delimits the actuation member receiving space.

10. The valve unit according to claim 1, wherein the second pilot working channel in the first pilot valve housing comprises a front channel section, said front channel section leading to the main valve, and wherein the first pilot valve housing further comprises a rear channel section, said rear channel section leading to the second pilot valve, wherein each of the front and rear channel sections have an inner channel opening extending into the actuation member receiving space at peripheral regions of the actuation member receiving space, said peripheral regions of the actuation member receiving space being distanced to one another in the circumferential direction of the hand actuation member.

11. The valve unit according to claim 10, wherein the peripheral regions of the actuation member receiving space lie diametrically opposite in the valve longitudinal direction.

12. The valve unit according to claim 1, wherein a movement direction of the actuation movement of the hand actuation member runs in a valve height direction of the valve unit, the valve height direction being perpendicular to the valve longitudinal direction.

13. The valve unit according to claim 12, wherein, for carrying out its actuation movement, the hand actuation member is displaceable in the actuation member receiving space of the first pilot valve housing in a purely linear manner.

14. The valve unit according to claim 1, wherein the hand actuation member has a round peripheral outer contour, wherein the actuation member receiving space has a complementary round inner contour at least in the region of the hand actuation member.

15. The valve unit according to claim 1, wherein the hand actuation member comprises two sealing rings, said two sealing rings being distanced to one another in the movement direction of the actuation movement and wherein said two sealing rings sealingly bear on an inner peripheral surface of the actuation member receiving space in a slidingly displaceable manner for sealingly closing the receiving space channel section of the second pilot working channel at axially opposite sides.

16. The valve unit according to claim 1, wherein a pilot valve channel section of the first pilot working channel has a first pilot exit opening at a front end face of the first pilot valve housing, wherein the first pilot working channel extends in the pilot valve device, and wherein a pilot valve channel section of the second pilot working channel extends in the pilot valve device and has a second pilot exit opening at the front end-face of the first pilot valve housing, wherein the front end-face of the first pilot valve housing faces the main valve.

17. The valve unit according to claim 16, wherein the two pilot exit openings lie in a common middle plane of the valve unit and are distanced to one another in the valve height direction, said common middle plane being spanned by a valve longitudinal axis of the valve unit and a valve height axis of the valve unit, said valve longitudinal axis of the valve unit defining the valve longitudinal direction and said valve height axis of the valve unit defining the valve height direction.

18. The valve unit according to claim 1, wherein the two pilot valves are formed separately from one another and the second pilot valve comprises a second pilot valve housing, said second pilot valve housing being separate with respect to the first pilot valve housing, wherein the first and second pilot valve housings in a joining region and with end-faces are applied onto one another in the valve longitudinal direction, wherein said end faces of the first and second pilot valve housings face one another.

19. The valve unit according to claim 18, wherein the second pilot working channel comprises a first working channel section, said first working channel section containing the receiving space channel section and extending through the first pilot valve housing of the first pilot valve, and wherein the second working channel section further comprises a second working channel section, said second working channel section extending in the second pilot valve housing of the second pilot valve, wherein the first working channel section and the second working channel section are in fluid connection with one another in the joining region of the two pilot valve housings.

20. The valve unit according to claim 1, wherein the second pilot valve is provided with a hand actuation device, said hand actuation device comprising a hand actuation member, said hand actuation member being received at least partly in an actuation member receiving space and further being accessible from outside the pilot valve device for manually creating an actuation movement, said actuation movement actuating the second pilot valve.

21. The valve unit according to claim 1, wherein the first pilot valve comprises a first pilot valve member, said first pilot valve member being movably arranged in the first pilot valve housing, and the second pilot valve comprises a second pilot valve member, wherein each pilot valve member is electrically or manually actuatable for changing the operating state of the assigned pilot valve.

* * * * *